US006022656A

United States Patent [19]

Visser et al.

[11] Patent Number: 6,022,656

[45] Date of Patent: Feb. 8, 2000

[54] BIPOLAR ELECTROPHOTOGRAPHIC ELEMENTS

[75] Inventors: Susan A. Visser, Rochester; Paul M. Borsenberger, Hilton; Jeanne E. Kaeding, Rochester, all of N.Y.

[73] Assignee: Eastman Kodak Company, Rochester, N.Y.

[21] Appl. No.: 09/070,705

[22] Filed: Apr. 30, 1998

[51] Int. Cl.[7] .................... G03H 15/02

[52] U.S. Cl. .................... 430/58.65; 430/59.1; 430/59.5; 430/67; 430/83

[58] Field of Search .................... 430/78, 79, 58.65, 430/59.1, 67, 83

[56] References Cited

U.S. PATENT DOCUMENTS

| | | | |
|---|---|---|---|
| 3,615,396 | 10/1971 | Gramza et al. | 96/1.7 |
| 3,615,414 | 10/1971 | Light | 96/1.6 |
| 3,615,415 | 10/1971 | Gramza | 96/1.7 |
| 4,175,961 | 11/1979 | Wright | 430/58 |
| 4,469,769 | 9/1984 | Nakazawa et al. | 430/78 |
| 4,701,396 | 10/1987 | Hung et al. | 430/58 |
| 4,968,571 | 11/1990 | Gruenbaum et al. | 430/58 |
| 5,614,342 | 3/1997 | Molaire et al. | 430/78 |
| 5,683,842 | 11/1997 | Duff et al. | 430/78 |

OTHER PUBLICATIONS

B.J. Murray, J.E. Kaeding, W.T. Gruenbaum, and P.M. Borsenberger, *A Bipolar Charge Transport Molecule, Jpn. J. Appl. Phys.* 1996,35,5384–5388.

J.E. Kaeding, B.J. Murray, W.T. Gruenbaum, and P.M. Borsenberger, *Bipolar Transport in a Moleculary Doped Polymer Containing A Bifunctional Dopant Molecule*, J. Imag. Sci. Technol. 1996, 40, 245–248.

W. Sorenson and T. Campgell, *Preparative Methods of Polymer Chemistry*, p. 147, Interscience (1968).

*Primary Examiner*—John J. Goodrow

*Attorney, Agent, or Firm*—Doreen M. Wells

[57] ABSTRACT

A photoconductive element comprising an electrically conductive support and at least one active layer, said active layer comprising N-(p-(di-p-tolylamino)phenyl)-N'-(1,2-dimethylpropyl)-1,4,5,8-naphthalenetetracarboxylic diimide and one or more perylene dyes of structure I:

I

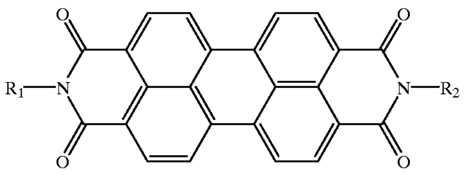

wherein $R_1$ and $R_2$ are, each independently,

II

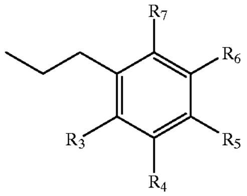

or

III

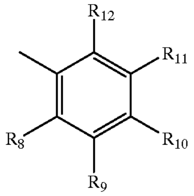

and $R_3$, $R_4$, $R_5$, $R_6$, $R_7$, $R_8$, $R_9$, $R_{10}$, $R_{11}$ and $R_{12}$ are, each independently, H, $CH_3$, or $C_2$–$C_4$ alkyl, linear or branched.

21 Claims, No Drawings

BIPOLAR ELECTROPHOTOGRAPHIC ELEMENTS

CROSS REFERENCE TO RELATED APPLICATIONS

This application is related to the following commonly owned U.S. application filed on even date herewith: U.S. Ser. No. 09/070,430 of Visser, Rimai and Borsenberger, titled "ELECTROPHOTOGRAPHIC ELEMENTS HAVING DLC CHARGE-INJECTION BLOCKING LAYERS".

FIELD OF THE INVENTION

The invention relates to electrophotographic elements. More particularly, it relates to photoconductive elements comprising combinations of a particular bipolar charge transport material and certain charge generation materials that are useful as bipolar photoconductive elements.

BACKGROUND OF THE INVENTION

Electrophotographic imaging processes and techniques have been extensively described in both the patent and other literature. Generally, these processes have in common the steps of employing a photoconductive insulating element which is prepared to respond to imagewise exposure with electromagnetic radiation (e.g., visual or near infrared radiation) by forming a latent electrostatic charge image. A variety of subsequent operations, now well-known in the art, can then be employed to produce a visible record of the electrostatic image.

Photoconductive elements, also called photoreceptors, are composed of an electrically conductive support and at least one active layer which is insulating in the dark but which becomes conductive upon exposure to light. The support may be in one of many forms, for example, a drum, a web or belt, or a plate. The photoreceptor can comprise one or multiple active layers. The active layer(s) typically contains one or more materials capable of the photogeneration of charge carriers (electrons or holes) and one or more materials capable of transport of the generated charge carriers.

Numerous materials have been described as being useful components of the photoreceptor. These include inorganic substances, such as selenium and zinc oxide, and organic compounds, both monomeric and polymeric, such as arylamines, arylmethanes, carbazoles, pyrroles, phthalocyanines, dye-polymer aggregates, and the like. Organic compounds are particularly useful for several reasons: they can be prepared as flexible layers; they have spectral sensitivities that can extend throughout the visible and into the near infrared regions of the spectrum; and they can be readily prepared by low cost solvent coating technologies. Photoconductive elements prepared from organic materials are known as organic photoconductors (OPCs).

OPCs can be prepared with single or multiple active layers. In most OPCs, charge transport occurs through movement of a single type of charge carrier, electrons or holes, but not both. When only one carrier is mobile, trapped carriers of opposite sign can be created, resulting in a change in sensitometry of the active layer with successive cycles and in a phenomenon known as latent image hysteresis. One solution to the problem of latent image hysteresis is to separate the charge generation and transport functions into separate layers, referred to as the charge generation (CGL) and charge transport (CTL) layers, to form a dual or multilayer photoconductive element. These elements offer additional advantages of improved process lifetimes that make them useful in high volume copying and printing applications. A disadvantage of the multiple layer architecture is that only one polarity of surface potential may be employed, limiting the electrophotographic processes in which the element can be used.

There are certain restrictions on the charge generation (CGM) and charge transport (CTM) materials that can be combined to form a useful photo-conductive element. In particular, the useful combinations of CGMs and CTMs are limited by their relative oxidation or reduction potentials. The oxidation potential is the relevant parameter in the case of hole transport; the reduction potential is the relevant parameter for electron transport. It is only when an appropriate match of potentials between the CGM and CTM is achieved that a useful photoconductive element can be prepared. Thus, while it is possible to demonstrate a material is capable of charge transport, for example, this does not necessarily imply that this material would be useful in a photoconductive element used in electrophotography.

Many useful photoconductive elements containing appropriately matched CGMs and CTMs are known. Most of these are comprised of CTMs which are capable of transporting only a single carrier type, either electrons or holes; these elements are referred to as monopolar photoconductive elements. These elements have the limitation that they can only be used with one polarity of charging, limiting the processes in which they can be applied.

Few bipolar photoconductive elements, comprised of CTMs capable of transporting both carrier types, are known. The known elements have several disadvantages. The bipolar transport in these elements arises from CTMs which are complexes of at least two separate materials. The necessity to form the complexes both increases the complexity of the manufacture of these elements and increases the likelihood that imperfectly formed complexes will give rise to defect points in the element. Also, the complexes are not stable over long periods of time. Thus, there is a need for a bipolar photoconductive element that is comprised of a single CTM capable of bipolar transport.

Only one bipolar charge transport molecule, a single molecule capable of transporting both electrons and holes, is known. Murray et al. (B. J. Murray, J. E. Kaeding, W. T. Gruenbaum, and P. M. Borsenberger, *Jpn. J. Appl. Phys.* 1996, 35, 5384–5388) reported that N-(p-(di-p-tolylamino)phenyl)-N'-(1,2-dimethylpropyl)-1,4,5,8-naphthalenetetracarboxylic diimide (TAND), in combination with an amorphous selenium CGL, could transport both electrons and holes. Amnorphous selenium is undesirable for practical application in a photoconductive element because of the hazards associated with its deposition and disposal. Further, its spectral sensitivity extends to only 500 nm, too low for most applications. Kaeding et al. (J. E. Kaeding, B. J. Murray, W. T. Gruenbaum, and P. M. Borsenberger, *J. Imag. Sci. Technol.* 1996, 40, 245–248) further reported bipolar transport by TAND in combination with an unspecified perylene diimide. While the electron and hole mobilities of TAND are analyzed in this paper, no mention is made of the electrophotographic properties of a photoconductive element containing TAND in combination with a CGL that would be useful in an electrophotographic process. The information in this paper is insufficient to prepare a practical photoconductive element for use in an electrophotographic process.

In order to be useful in an electrophotographic process, a photo-conductive element must display good photosensitivity and low residual voltage after exposure. The photosensitivity is a measure of the amount of energy required to discharge the photoconductor from an initial voltage to some predetermined potential. The residual voltage ($V_r$) is a measure of the charge remaining on the element after exposing the element. The residual voltage is the minimum voltage to which a photoconductive element can be discharged. A high residual voltage can give rise to a lower potential difference between charged and discharged areas of the element on subsequent imaging cycles. Blurred, fogged, or incomplete images result. Hence, for high process efficiency, high photosensitivity and low residual voltage are desired.

The electrophotographic properties of a photoconductive element are not inherent to a particular CTM or CGM but arise from the combination of CTM and CGM used to prepare the photoconductive element. Thus, materials which are known to be capable of charge generation or of charge transport will not obviously be useful for a photoconductive element used in an electrophotographic process.

A useful bipolar photoconductive element must display the desirable electrophotographic properties under both polarities of initial surface charge. A bipolar photoconductive element can be defined by the ratio of the exposure energies measured under positive and negative polarity initial charging. Specifically, if the exposure energy of the element after positive polarity charging is denoted $E_{50\%}^{+}$ and if the exposure energy of the element after negative polarity charging is denoted $E_{50\%}^{-}$, then a bipolar photoconductive element is one in which $\alpha=E_{50\%}^{+}/E_{50\%}^{-}$, where $\alpha$ is between 0.25 and 4.0. Both $E_{50\%}^{+}$ and $E_{50\%}^{-}$ are measured in erg/cm$^2$ and measure the energy necessary to discharge the photoconductive element from 400 V to 200 V.

SUMMARY OF THE INVENTION

It is a broad object of the present invention to provide useful bipolar photoconductive elements comprising a bipolar charge transport material. More particularly, it is an object of the present invention to provide bipolar photoconductive elements comprising the bipolar charge transport material N-(p-(di-p-tolylamino)phenyl)-N'-(1,2-dimethylpropyl)-1,4,5,8-naphthalenetetracarboxylic diimide and a charge generation material of structure I:

I

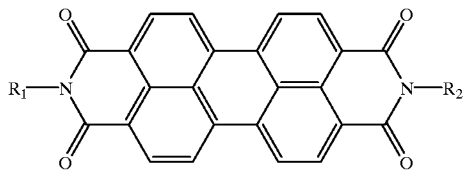

wherein $R_1$ and $R_2$ are, each independently,

II

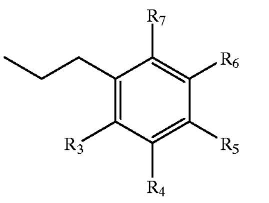

or

III

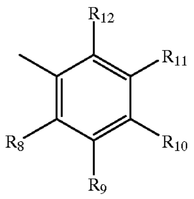

and $R_3$, $R_4$, $R_5$, $R_6$, $R_7$, $R_8$, $R_9$, $R_{10}$, $R_{11}$ and $R_{12}$ are, each independently, H, $CH_3$, or $C_2$–$C_4$ alkyl, linear or branched. It is preferred that at least two of $R_3$, $R_4$, $R_5$, $R_6$ and $R_7$ are H and at least two of $R_8$, $R_9$, $R_{10}$, $R_{11}$ and $R_{12}$ are H. More preferred structures are those in which at least three of $R_3$, $R_4$, $R_5$, $R_6$ and $R_7$ are H and at least three of $R_8$, $R_9$, $R_{10}$, $R_{11}$ and $R_{12}$ are H. Still more preferred structures are those in which either $R_1$ is structure II, wherein all of $R_3$, $R_4$, $R_5$, $R_6$, and $R_7$ are H, and $R_2$ is structure III, wherein $R_9$ and $R_{11}$ are $CH_3$ and $R_8$, $R_{10}$, and $R_{12}$ are H;

$R_1$ is structure II, wherein all of $R_3$, $R_4$, $R_5$, $R_6$, and $R_7$ are H, and $R_2$ is structure II, wherein $R_4$ is $CH_3$ and $R_3$, $R_5$, $R_6$, $R_7$ are H; or both $R_1$ and $R_2$ are structure II, with $R_4$ being $CH_3$ and $R_3$, $R_5$, $R_6$, $R_7$ being H.

Most preferred is the structure in which both $R_1$ and $R_2$ are structure II with all of $R_3$, $R_4$, $R_5$, $R_6$, and $R_7$ are H.

It is a further object of the present invention to provide useful bipolar photoconductive elements comprising N-(p-(di-p-tolylamino)phenyl)-N'-(1,2-dimethylpropyl)-1,4,5,8-naphthalenetetracarboxylic diimide and charge generation materials of structure IV:

IV

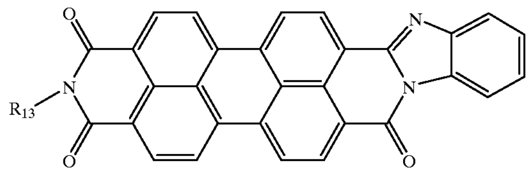

wherein $R_{13}$ is structure II with $R_3$, $R_4$, $R_5$, $R_6$, and $R_7$ being, each independently, H, $CH_3$, or $C_2$–$C_4$ alkyl, linear or branched. It is preferred that $R_3$, $R_4$, $R_6$, and $R_7$ are H and $R_5$ is H or $CH_3$.

It is a further object of the present invention to provide useful bipolar photoconductive elements comprising N-(p-(di-p-tolylamino)phenyl)-N'-(1,2-dimethylpropyl)-1,4,5,8-naphthalenetetracarboxylic diimide and charge generating pigments selected from the group consisting of titanyl fluorophthalocyanines and cocrystalline mixtures of unsubstituted titanyl phthalocyanine and titanyl fluorophthalocyanine. Unsubstituted titanyl phthalocyanine has the structure:

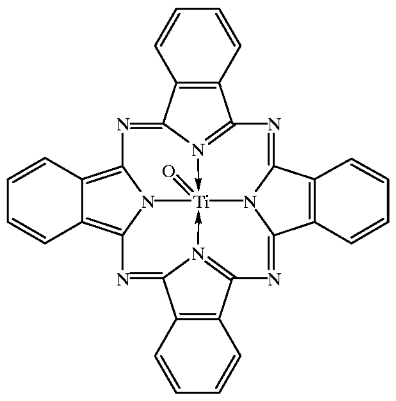

The useful titanyl fluorophthalocyanines have the general structure:

V

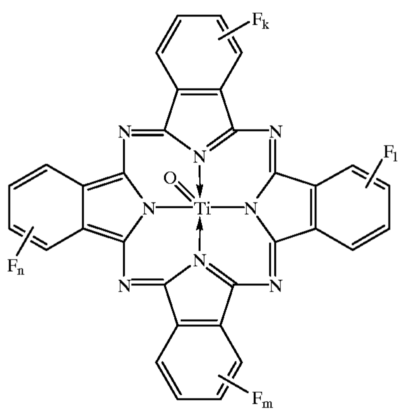

where each of k, l, m, and n is independently an integer from 1 to 4. Cocrystalline mixtures of unsubstituted titanyl phthalocyanine and titanyl tetrafluorophthalocyanine are preferred.

It is still further an object of the present invention to provide useful bipolar photoconductive elements comprising N-(p-(di-p-tolylamino)phenyl)-N'-(1,2-dimethylpropyl)-1,4,5,8-naphthalenetetracarboxylic diimide and dye-polymer aggregate charge generation materials.

DETAILED DESCRIPTION OF THE INVENTION

The photoconductive elements of this invention, comprising N-(p-(di-p-tolylamino) phenyl)-N'-(1,2-dimethylpropyl)-1,4,5,8-naphthalenetetracarboxylic diimide in combination with specific CGMs, are useful as bipolar photo-conductive elements in electrophotographic apparatus, such as copiers or printers. They are particularly useful in those processes in which both negative and positive polarity charging of the element are used, either in the same process cycle or in different process cycles, to achieve advantageous results.

The bipolar photoconductive elements of this invention comprise N-(p-(di-p-tolylamino) phenyl)-N'-(1,2-dimethylpropyl)-1,4,5,8-naphthalenetetracarboxylic diimide (TAND) in combination with specific CGMs. These may be present in a single photoconductive layer or in two or more layers. The single or multiple layers are known as the active layers. The layer structure may be of the function separated type, in which the charge transport and charge generation functions are in separate layers, or of the single layer type, in which both charge generation and charge transport occur in the same layer.

The synthesis of TAND can be accomplished as described in B. J. Murray, J. E. Kaeding, W. T. Gruenbaum, and P. M. Borsenberger, *Jpn. J. Appl. Phys.* 1996, 35, 5384–5388.

In addition to TAND and the specified charge generation materials, the active layers may contain one or more binder materials. The binder should provide little or no interference with the generation and transport of charges in the layer. The binder can also be selected to provide additional functions, such as improving adhesion to another layer or providing a smooth, easily cleaned, wear-resistant surface in a top layer. Common binder types include styrene-butadiene copolymers; vinyl toluene-styrene copolymers; styrene-allyd resins; silicone-alkyd resins; soya-alkyd resins; vinylidene chloride-vinylchloride copolymers; poly(vinylidene chloride); vinyldene chloride-acrylonitrile copolymers; vinyl acetate-vinyl chloride copolymers; poly(vinyl acetals), such as poly(vinyl butyral); nitrated polystyrene; poly (methylstyrene); polystyrene; isobutylene polymers; polyesters, such as poly{ethylene-co-alkylene bis (alkyleneoxyaryl) phenylenedicarboxylate}; phenol-formaldehyde resins; ketone resins; polyamides; polycarbonates; polythiocarbonates; copolymers of vinyl haloacrylates and vinyl acetate such as poly(vinyl-m-bromobenzoate-co-vinyl acetate); chlorinated poly(olefins), such as chlorinated poly(ethylene); cellulose derivatives such as cellulose acetate, cellulose acetate butyrate, and ethyl cellulose; and polyimides such as poly{1,1,3-trimethyl-3-(4'-phenyl)-5-indane pyromellitimide}. One group of polyester binders useful in a charge transport layer is the subject of commonly assigned, co-pending U.S. Ser. No. 08/584,502 entitled ELECTROPHOTO-GRAPHIC ELEMENTS HAVING CHARGE TRANSPORT LAYERS CONTAINING HIGH MOBILITY POLYESTER BINDERS of Sorriero, O'Regan and Borsenberger, filed on Jan. 11, 1996. The polyester binders have the following structural formula:

VI

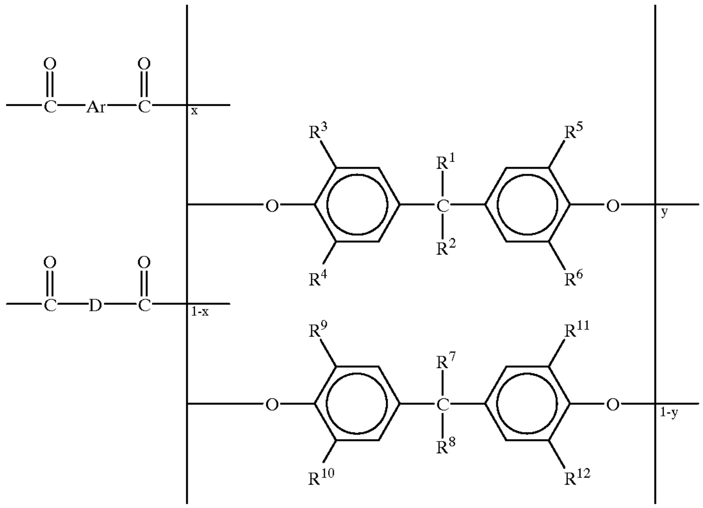

wherein:

Ar represents phenylene, terephthaloyl, isophthaloyl, 5-t-butyl-1,3-phenylene or phenylene indane;

D represents alkylene, linear or branched, or cycloalkylene, having from 4 to about 12 carbons;

$R^1$, $R^2$, $R^7$, and $R^8$ represent H, alkyl having 1 to 4 carbon atoms, cyclohexyl, norbomyl, phenylindanyl, perfluoralkyl having 1 to 4 carbon atoms, α, α-dihydrofluoroalkyl having 1 to 4 carbon atoms, or α, α, ω-hydrofluoroalkyl having 1 to 4 carbon atoms; and $R^3$, $R^4$, $R^5$, $R^6$, $R^9$, $R^{10}$, $R^{11}$, and $R^{12}$ represent H, halogen, or alkyl having from 1 to about 6 carbons; x is from 0 to 0.8; and y is from 0 to 1, with x and y being mole ratios.

The polyester binders can be prepared using well known solution polymerization techniques such as disclosed in W. Sorenson and T. Campbell, Preparative Methods of Polymer Chemistry, page 137, Interscience (1968). Schotten-Baumann conditions were employed to prepare the following examples of useful polyester binders: poly{4,4'-isopropylidene bisphenylene terephthalate-co-azelate (70/30)}; poly{4,4'-isopropylidene bisphenylene terephthalate-co-isophthalate-co-azelate (50/25/25)}; poly{4,4'-isopropylidene bisphenylene-co-4,4'-hexafluoroisopropylidene bisphenylene (75/25) terephthalate-co-azelate (65/35)}; poly{4,4'-isopropylidene bisphenylene-co-4,4'-hexafluroisopropylidene bisphenylene (50/50) terephthalate-co-azelate (65/35)}; poly{4,4'-hexafluoroisopropylidene bisphenylene terephthalate-co-azelate (65/35)}; poly{hexafluoroisopropylidene bisphenylene terephthalate-co-isophthalate-co-azelate (50/25/25)}; and poly{4,4'-isopropylidene bisphenylene isophthalate-co-azelate (50/50)}.

Examples of binder polymers which are particularly desirable from the viewpoint of minimizing interference with the generation or transport of charges include: bisphenol-A polycarbonates and polyesters such as poly[(4,4'-norbornylidene)diphenylene terephthalate-co-azelate]. Polyester ionomers are useful as well. Examples of such polyester ionomers include:

poly[1,4-cyclohexylenedimethylene-co-2,2'-oxydiethylene (46/54) isophthalate-co-5-sodiosulfoisophthalate (95/5)];

poly[1,4-cyclohexylenedimethylene-co-2,2'-oxydiethylene (46/54) isophthalate-co-5-sodiosulfoisophthalate (90/10)];

poly[1,4-cyclohexylenedimethylene-co-2,2'-oxydiethylene (46/54) isophthalate-co-5-sodiosulfoisophthalate (85/15)];

poly[1,4-cyclohexylenedimethylene-co-2,2'-oxydiethylene (46/54) isophthalate-co-5-sodiosulfoisophthalate (80/20)];

poly[1,4-cyclohexylenedimethylene-co-2,2'-oxydiethylene (46/54) isophthalate-co-5-sodiosulfoisophthalate (75/25)];

poly[1,4-cyclohexylenedimethylene-co-2,2'-oxydiethylene (46/54) isophthalate-co-5-lithiosulfoisophthalate (90/10)];

poly[1,4-cyclohexylenedimethylene-co-2,2'-oxydiethylene (46/54) isophthalate-co-triphenylmethylphosphoniumsulfoisophthalate (90/10)];

poly[1,4-cyclohexylenedimethylene-co-2,2'-oxydiethylene (46/54) isophthalate-co-5-(4-sulfophenoxy)isophthalate (90/10)];

poly[1,4-cyclohexyloxydiethylene terephthalate-co-4-(4-sulfophenoxy)isophthalate (70/30)]; and poly(1,4-cyclohexylenedimethylene-co-2,2'-oxydiethylene (46/54) isophthalate-co-4,4'-dicarboxyphenylmethylphenyl phosphonium p-toluenesulfonate (90/10)].

When a polymeric binder is employed in either the CGL or CTL, the optimum ratio of CGM or CTM to binder may vary widely depending on the particular binder and CGMs or CTMs. In general, useful results are obtained when the amount of active CGM or CTM contained within the layer varies within the range of from about 2 to about 90 weight percent based on the dry weight of the layer.

The active layers of the elements of this invention can contain more than one of the CGMs of this invention in combination with TAND. Further, a single active layer or a CGL containing one or more of the CGMs of this invention can also be combined with appropriate spectral sensitizing dyes or chemical sensitizers in order to control the sensitivity of the layer to particular wavelengths of radiation. For photoconductive elements of the function separated, multilayer type, it is also possible to include a CTM in a CGL, as is known to one skilled in the art. Examples of CIMs known to be useful in CGLs include arylamnines, particularly triarylamines, and polyarylalkanes, in particular 1,1-bis(di-4-tolylaminophenyl)-cyclohexane) and 4-N,N-(diethylamino)tetraphenylmethane. For elements containing more than one CGL, there may be different CTMs in each CGL. The CTMs used in the CGL need not be TAND, the primary charge transport material in the CTL.

For a bipolar photoconductive element of the function separated type, the thickness of the CTL may vary. A preferred thickness for the CTL is from about 2 to about 50 micrometers (μm) dry thickness. A more preferred range is from about 5 to about 20 μm. The CTL in a function-separated type photoconductive element can be a single layer or multiple layers.

For a bipolar photoconductive element of the single layer type, the thickness of the active layer may vary. A preferred thickness for the layer is from about 2 to about 50 μm. A more preferred range is from about 5 to about 20 μm.

The precise concentration of TAND in the bipolar photoconductive elements of this invention can be varied to achieve optimal function, as is known to those skilled in the art. A preferred concentration of TAND is from 2–100 weight percent (wt %), based on the dry weight of the active layer in which the TAND resides. A more preferred concentration is 30–100 wt %. Those skilled in the art will understand that the optimal concentration of TAND will differ depending on whether the bipolar photoconductive element is of the single layer or function separated type, with the highest TAND concentration (e.g., 100 wt %) being useful primarily in the function-separated elements.

Coating aids, such as levelers, surfactants, crosslinking agents, colorants, plasticizers, and the like can be added to the layers of this invention. The quantity of each of the respective additives present in a coating composition can vary, depending upon the results desired and user preferences. The layers can also optionally contain other addenda such as sensitizers (spectral sensitizing dyes and chemical sensitizers), contrast control agents, and release agents, as is well known in the art.

A CGM useful in combination with TAND in the photoconductive elements of this invention is represented by structure I:

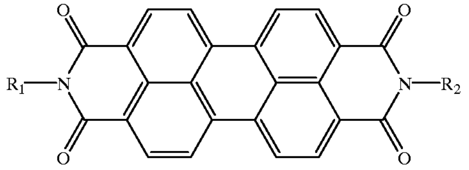

I wherein $R_1$ and $R_2$ are, each independently

II

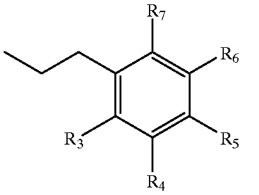

or

III

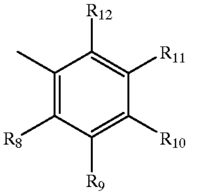

and $R_3$, $R_4$, $R_5$, $R_6$, $R_7$, $R_8$, $R_9$, $R_{10}$, $R_{11}$, and $R_{12}$ are, each independently, H, $CH_3$, or $C_2$–$C_4$ alkyl, linear or branched. It is preferred that at least two of $R_3$, $R_4$, $R_5$, $R_6$ and $R_7$ are H and at least two of $R_8$, $R_9$, $R_{10}$, $R_{11}$ and $R_{12}$ are H. More preferred structures are those in which at least three of $R_3$, $R_4$, $R_5$, $R_6$ and $R_7$ are H and at least three of $R_8$, $R_9$, $R_{10}$, $R_{11}$, and $R_{12}$ are H. Still more preferred structures are those in which $R_1$ is structure II, wherein all of $R_3$, $R_4$, $R_5$, $R_6$, and $R_7$ are H, and $R_2$ is structure III, wherein $R_9$ and $R_{11}$ are $CH_3$ and $R_8$, $R_{10}$, and $R_{12}$ are H $R_1$ is structure II, wherein all of $R_3$, $R_4$, $R_5$, $R_6$, and $R_7$ are H, and $R_2$ is structure II, wherein $R_4$ is $CH_3$ and $R_3$, $R_5$, $R_6$, $R_7$ are H both $R_1$ and $R_2$ are structure II, with $R_4$ being $CH_3$ and $R_3$, $R_5$, $R_6$, $R_7$ being H Most preferred is the structure in which both $R_1$ and $R_2$ are structure II with all of $R_3$, $R_4$, $R_5$, $R_6$, and $R_7$ are H.

Also useful as CGMs in combination with TAND are materials of structure IV:

IV

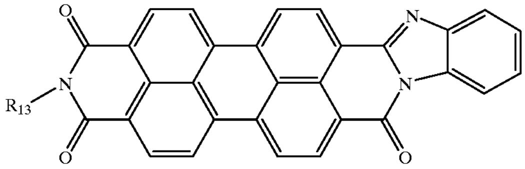

wherein $R_{13}$ is structure II with $R_3$, $R_4$, $R_5$, $R_6$, and $R_7$ being, each independently, H, $CH_3$, or $C_2$–$C_4$ alkyl, linear or branched. It is preferred that $R_3$, $R_4$, $R_6$, and $R_7$ are H and $R_5$ is H or $CH_3$.

When prepared as part of a CGL, the CGMs of structures I and IV can be prepared as dispersions in a polymeric binder or as vacuum-evaporated pure materials.

A further class of CGMs useful in combination with TAND in the photoconductive elements of this invention are dye-polymer aggregates. Dye-polymer aggregates are photoconductive compositions that have a continuous electrically insulating polymer phase containing a fimely divided, particulate cocrystalline complex of at least one pyrylium-type dye salt and at least one polymer having an alkylidene-diarylene group in a recurring unit. Aggregate photoconductive compositions are described in U.S. Pat. No. 3,615,414 and U.S. Pat. No. 4,175,961, the contents of which are incorporated herein by reference. The aggregate photoconductive compositions can be prepared by a number of methods, such as those disclosed by Gramza et al. in U.S. Pat. No. 3,615,396 and U.S. Pat. No. 3,615,415. By whatever method prepared, the aggregate composition is applied with a suitable liquid coating vehicle onto a support or underlying layer to form a separately identifiable multiphase aggregate composition, the heterogeneous nature of which is generally apparent when viewed under magnification, although such compositions may appear to be uniform to the naked eye in the absence of magnification. There can, of course, be macroscopic heterogeneity. Suitably, the pyrylium type dye-salt-containing aggregate in the discontinuous phase is fmely divided, i.e., typically predominantly in the size range of from about 0.01 to about 25 μm.

A useful thickness for each CGL is within the range of from about 0.1 to about 10 μm dry thickness, particularly from about 0.5 to about 5 μm.

In one method of preparation of the active layers of the elements of the invention, the components of the layer, including binder and any desired addenda, are dissolved or dispersed together in an organic solvent to form a coating composition which is then solvent coated over a conductive support. The liquid is then caused to evaporate from the mixture to form the active layer.

Suitable organic solvents include aromatic hydrocarbons such as benzene, toluene, xylene and mesitylene; ketones such as acetone, butanone and 4-methyl-2-pentanone; halogenated hydrocarbons such as dichloromethane, 1,1,2-trichloroethane, chloroform and ethylene chloride; ethers including ethyl ether and cyclic ethers such as dioxane and tetrahydrofuran; other solvents such as acetonitrile and dimethylsulfoxide; and mixtures of such solvents. The amount of solvent used in forming the binder solution is typically in the range of from about 2 to about 100 parts of solvent per part of binder by weight, and preferably in the range of from about 10 to 50 parts of solvent per part of binder by weight.

Another method for deposition of one or more of the active layers of the elements of this invention is vacuum evaporation. In multilayer photoconductive elements, it is possible to deposit only one of the layers by vacuum evaporation and the rest by coating from a solution or to deposit some fraction of the layers by vacuum evaporation and the rest by coating from a solution.

Further materials that are useful as CGMs in combination with TAND to provide useful bipolar photoconductive elements are pigments selected from the group consisting of titanyl fluorophthalocyanines and cocrystaline mixtures of unsubstituted titanyl phthalocyanine and titanyl fluorophthalocyanine, as disclosed in U.S. Pat. No. 5,614,342, the contents of which are incorporated herein by reference. The useful titanyl fluorophthalocyanines have the general structure:

V

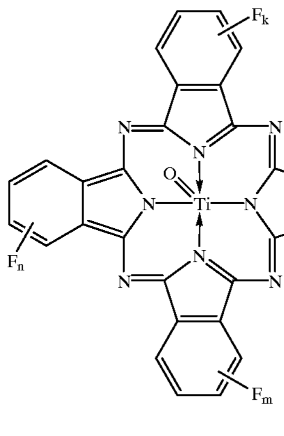

where each of k, l, m, and n is independently an integer from 1 to 4. Cocrystalline mixtures of unsubstituted titanyl phthalocyanine and titanyl tetrafluorophthalocyanine are preferred. The cocrystalline mixtures of titanyl fluorophthalocyanine and unsubstituted titanyl phthalocyanine have a distinct crystallogram exhibiting major peaks of the Bragg angle at 2-θ with respect to X-rays of Cu Kα at a wavelength of 1.541 Å at 7.5, 10.2, 12.7, 13.2, 15.1, 16.1, 17.2, 18.5, 22.4, 24.2, 25.3, 28.7 (all +/−0.2) for a wide range of weight ratios of the starting phthalocyanines. Preparation of photoconductive or charge generation layers containing only titanyl fluorophthalocyanines are described in U.S. Pat. No. 4,701,396, the contents of which are herein incorporated by reference.

The following preparations disclose methods of making represenative cocrystalline mixtures of an unsubstituted titanyl phthalocyanine and a titanyl tetrafluorophthalocyanine.

Preparation 1

Unsubstituted Titanyl Phthalocyanine

Phthalonitrile (1100 grams) and titanium tetrachloride (813 grams) were suspended in 6800 milliliters (ml) of 1-chloronaphthalene and heated to 215–220° C. and maintained for 2.5 hours at this temperature. The reaction mixture was cooled to 140° C., and the dark solid was collected and washed with acetone and methanol. After drying, the dark blue solid (1090 grams) was slurried twice in refluxing 10 liters of distilled water for two hours, filtered hot each time, and washed with acetone to yield crude phthalocyanine. The X-ray diffraction spectrum exhibits major peaks of the Bragg angle at 7.5, 8.3, 10.5, 12.7, 14.2, 14.6, 18.9, 22.1, 24.3, 26.1, and 29.9 (all +/−0.2 degrees).

Preparation 2

Crude Titanyl Tetrafluorophthalocyanine

Tetrafluorophthalonitrile (38.7 grams, 0.267 mole) and titanium tetrachloride (20.7 grams, 0.134 mole) were suspended in 200 ml of 1-chloronaphthalene and heated to 210–215° C. and maintained for 2.5 hours at this temperature. The reation mixture w as cooled slightly, and the dark solid was collected and washed with acetone and methanol. After drying, the dark blue solid (34 grams) was slurried twice in refluxing dimethylformamide, filtered hot each time, and washed with acetone to yield crude titanyl tetrafluorophthalocyanine. The X-ray diffraction spectrum exhibits major peaks of the Bragg angle at 7.3, 10.6, 11.5, 11.8, 15.7, 16.6, 17.0, 18.2, 22.1, 23.2, 24.3, 27.0, and 31.2 (all +/−0.2 degrees).

Preparation 3

Cocrystalline Mixture of Unsubstituted Titanyl Phthalocyanine and Titanyl Tetrafluorophthalocyanine 75:25

7.5 grams (g) of crude titanyl phthalocyanine and 2.5 g of crude titanyl tetrafluorophthalocyanine were mixed in a 16 ounce jar with 300 g of 3 millimeter (mm) steel beads. The pigment sample was thus milled using a Sweco Vibro Energy grinding mill manufactured by Sweco, Inc., of Florence, Ky., for three days. The pigment particles completely fused, coating, the stainless steel beads.

200 g of dichloromethane were added to the jar. The mixture was further milled for 48 hours. Then the beads were separated, and the pigment was filtered, washed with dichoromethane, and dried. The X-ray diffraction spectrum of the dry-milled material exhibits three major broad peaks of the Bragg angle at 7.2, 15.4, and 25.5 (all +/−0.2 degrees), depicting a very noncrystalline mixture. After the dichloromethane treatment, the X-ray diffraction spectrum of the material exhibits major peaks of the Bragg angle at 7.5, 10.2, 12.7, 13.2, 15.1, 16.1, 17.2, 18.5, 22.4, 24.2, 25.3, and 28.7 (all +/−0.2 degrees).

A dispersion of a binder polymer and the pigment can be formed by mixing and dispersing the pigment with the binder polymer using a sand mill, ball mill, roll mill, attritor, or Sweco mill. A wide variety of organic solvents are useful in forming the dispersion subjected to milling. Solvents include, for example, aromatic hydrocarbons such as benzene, toluene, xylene, and mesitylene; ketones such as acetone, butanone and 4-methyl-2-pentanone; halogenated hydrocarbons such as dichloromethane, trichloroethane, methylene chloride, chloroform, and ethylene chloride; ethers including ethyl ether and cyclic ethers such as dioxane and tetrahydrofuran; other solvents such as acetonitrile and dimethylsulfoxide; and mixtures of such solvents. The amount of solvent used is typically in the range of from about 2 to about 100 parts of solvent per part of binder by weight, and preferably in the range of from about 10 to about 50 parts of solvent per part of binder by weight.

In the coating composition, the optimum ratio of pigment to binder or pigment and CTM to binder can vary widely, depending on the particular materials employed. In general, useful results are obtained when the total concentration of both pigment and CTM in a layer is within the range of about 0.01 to 90 weight percent, based on the dry weight of the layer.

In a preferred embodiment of a single active layer photoconductive element of the invention, the coating composition contains from about 10 to about 70 weight percent of charge transport agent and from about 0.01 to about 20 weight percent of pigment. In the preferred embodiment of the function-separated type, multilayer photoconductive element of the invention, the CGL coating composition contains from about 0 to about 50 weight percent of CTM and from about 0.01 to about 80 weight percent of pigment.

A CGL containing a pigment, for example a cocrystalline mixture of unsubstituted titanyl phthalocyanine and titanyl tetrafluorophthalocyanine, can be made using solvent coating techniques that are well known in the art. The dry thickness of this CGL is 0.05 to about 6 μm, preferably 0.001 to 1 μm. As those skilled in the art appreciate, as layer thickness increases, a greater proportion of incident radiation is absorbed by a layer, but the likelihood increases of trapping a charge carrier which then does not contribute to image formation. Thus, an optimum thickness of such a layer constitutes a balance between these competing effects. The weight ratio of pigment to the binder is in the range of from about 5:1 to about 1:5, preferable from about 2:1 to 1:4.

The active layers of the photoconductive elements of the invention can be affixed, if desired, directly to an electrically conductive support. In a function-separated photoconductive element of the invention, either a CGL or a CTL may be closer to or in contact with the conducting substrate. In some cases, it may be desirable to use one or more intermediate subbing layers or additional CTLs between the conductive support and the CTL or CGL, or between the CTL and CGL to improve adhesion between the CTL, the CGLs and the conductive support and/or to act as an electrical barrier layer between the element and the conductive support.

Electrically conductive supports include, for example, paper (equilibrated to a relative humidity above 50 percent); aluminum-paper laminates; metal foils such as aluminum foil, zinc foil, etc.; metal plates, such as aluminum, copper, zinc, brass and galvanized plates; vapor deposited metal layers such as silver, chromium, nickel, aluminum and the like coated on paper or conventional photographic film supports, such as cellulose acetate, polystyrene, poly (ethylene terephthalate), etc. Such conductive materials as chromium, aluminum, or nickel can be vacuum deposited on transparent film supports in sufficiently thin layers to allow photoconductive elements prepared therewith to be exposed from the front or the back of such elements. The support can be fabricated in any suitable configuration, for example, as a sheet, a drum, or an endless belt.

Electrical barrier layers, also known as charge-injection blocking layers, are used to prevent injection of charge carriers from the conducting layer or conductive support into the layer carrying the charge generation function. When such injection occurs, surface charges on the photoconductive element are dissipated in unexposed areas of its surface. Barrier layers are well known in the art and are typically composed of thin polymeric layers. Useful barrier layer materials include polyamides and the aforementioned polyester ionomers. Diamond-like carbon barrier layers useful in the photoconductive elements of the invention are disclosed in co-pending U.S. patent application Ser. No. 09/070,430 to Visser, Rimai, and Borsenberger, "Electrophotographic elements having diamond-like carbon charge-injection blocking layers," filed concurrently with the instant application.

The barrier layer is coated directly on the electrically conductive support. Anodized aluminum substrates can serve as combined substrate and barrier layer.

From the viewpoint of preparing photoconductive elements with long process lifetimes and resistance to wear, it is frequently desirable to prepare elements of the function-separated type in which the CTL is present as the outer-most layer. The photoconductive elements of this invention, both single layer and function-separated, can also have protective layers as their outermost layers, that is, layers farthest from the electrically conductive support. When a protective layer is used, it may be in contact with or closest to either a CGL or a CTL. The use of protective layers to enhance the lifetime of photoconductive elements is well known to those skilled in the art. Examples of useful protective layers include sol- gels, diamond-like carbon, fluorinated diamond-like carbon, and silicon carbide. In order to prevent interference with the functions of the active layers, it is desirable to make the protective layers as thin as possible. However, thicker layers are frequently better able to provide the protective function. Thus, the thickness of the protective layers is a balance between these two requirements and can be suitably adjusted depending on the requirements of the user. In general, the thickness of the protective layer will vary between 0.05 and 5 $\mu$m. It is preferred that the thickness be between 0.05 and 1 $\mu$m. The protective layer can have a graduated composition or be composed of more than one layer in order to improve its protective ability or to achieve other goals, such as improved adhesion to underlying layers.

Photoconductive elements of the invention can include various additional layers known to be useful in electrophotographic elements, for example, subbing layers, overcoat layers, and screening layers.

Photoconductive elements of this invention can be used in electrophotographic processes in which only one polarity of charging is used. Such processes are well known to those skilled in the art The photoconductive elements of the invention are of particular relevance for electrophotographic processes that use both polarities of charging. Such a process could use toners of two different polarities to form images of two colors or with two different surface textures, for example. The photoconductive elements of this invention could also advantageously be used, for example, in an electrophotographic process or apparatus that uses both charged area development (CAD) and discharged area development (DAD) with a single toner.

The following examples are presented for a further understanding of the invention.

EXAMPLE 1

A bipolar photoconductive element was prepared as follows. A nickel-coated poly(ethylene terephthalate) (PET) support was coated with a barrier layer solution made of a polyamide (sold under the tradename Amilon™ CM8000 by Toray Chemical Company) in an ethanol/1,1,2-trichloroethane 60:40 mixture. The solvent was removed, and the barrier layer dry thickness was about 0.5 $\mu$m. Onto the barrier layer, a 3000 Å thick CGL composed of the perylene CGM N,N-bis(2-phenethyl)-perylene-3,4,9,10-bis (dicarboximide) of structure VII was deposited by vacuum evaporation:

VII

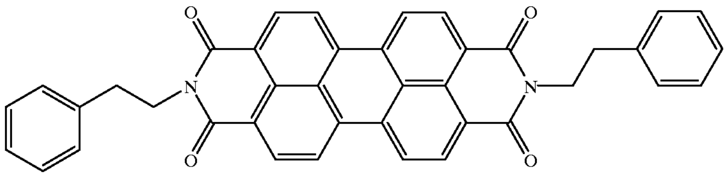

A CTL was prepared by mixing 50 weight percent N-[p-(di-p-tolylamino)phenyl]-N'-(1,2-dimethylpropyl)-1,4,5,8-naphthalenetetracarboxylic diimide (TAND) and 50 weight percent of the bisphenol-A polycarbonate Lexan™ 145 (General Electric Company) in dichloromethane to give a 10% solids solution. After the solids had dissolved, the solution was coated onto the CGL, and the solvent was allowed to evaporate to give a CTL with a dry thickness of 13 $\mu$m.

Photoinduced discharge measurements were performed to measure the sensitivity, residual voltage, and dark decay of the element. This involved initially charging the photoconductive element to an absolute value of the potential of 400 V in the dark, then exposing the photoconductive element to 680 nm radiation, and measuring the change in voltage as a function of time. The exposure energy (erg/cm$^2$) is defined as the energy required to discharge the photoconductor from 400 V to 200 V (−400 V to −200 V if the initial charging polarity is negative) and is denoted as $E_{50\%}$; it is inversely related to the sensitivity. The exposure energy of the element after positive polarity charging is denoted $E_{50\%}^{+}$. The exposure energy of the element after negative polarity charging is denoted $E_{50\%}^{+}$. The ability of the element to behave as a bipolar photoconductive element is measured by $\alpha$, the ratio of the exposure energy under positive polarity charging to that under negative initial charging: $\alpha=E_{50}^{+}/E_{50\%}^{-}$. Values of $\alpha$ between 0.25 and 4.0 indicate that the element is a bipolar photoconductive element. The residual voltage is the final voltage on the photoconductive element and is denoted as $V_r$. The dark decay of the sample was measured by charging the sample to 400 V and monitoring the decrease in voltage over a 15 second period. Lower exposure energies, residual voltages, and dark decays are more desirable. The testing was performed using positive and negative initial charging. The results are shown in Table 1.

EXAMPLE 2

A bipolar photoconductive element was prepared as follows. A nickel-coated PET support was coated with a barrier layer solution made of a Amilon™ CM8000 in an ethanol/1,1,2-trichloroethane 60:40 mixture. The solvent was removed, and the barrier layer dry thickness was about 0.5 $\mu$m. Onto the barrier layer, a 3000 Å thick CGL composed of the perylene CGM of structure VII was deposited by vacuum evaporation:

VIII

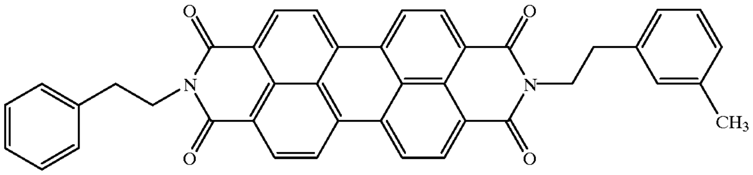

A CTL was prepared by mixing 40 weight percent TAND and 60 weight percent of the bisphenol-A polycarbonate Lexan™ 145 (General Electric Company) in dichloromethane to give a 10% solids solution. After the solids had dissolved, the solution was coated onto the CGL, and the solvent was allowed to evaporate to give a CTL with a dry thickness of 13 $\mu$m.

Testing was performed as described in Example 1. The results are shown in Table 1.

EXAMPLE 3

A bipolar photoconductive element was prepared as follows. A nickel-coated PET support was coated with a barrier layer solution made of Amilon™ CM8000 in an ethanol/1,1,2-trichloroethane 60:40 mixture. The solvent was removed, and the barrier layer dry thickness was about 0.5 $\mu$m. Onto the barrier layer, a 3000 Å thick CGL composed of the perylene CGM of structure IX was deposited by vacuum evaporation:

IX

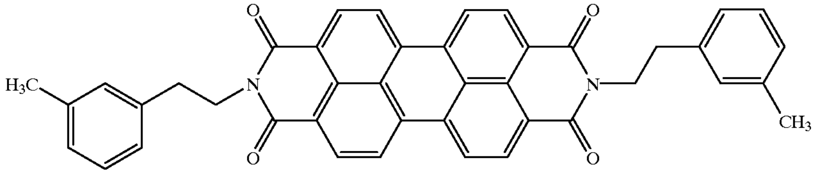

A CTL was prepared by mixing 40 weight percent TAND and 60 weight percent of the bisphenol-A polycarbonate Lexan™ 145 (General Electric Company) in dichloromethane to give a 10% solids solution. After the solids had dissolved, the solution was coated onto the CGL, and the solvent was allowed to evaporate to give a CTL with a dry thickness of 13 $\mu$m.

Testing was performed as described in Example 1. The results are shown in Table 1.

EXAMPLE 4

A bipolar photoconductive element was prepared as follows. A nickel-coated PET support was coated with a barrier layer solution made of Amilon™ CM8000 in an ethanol/1,1,2-trichloroethane 60:40 mixture. The solvent was removed, and the barrier layer dry thickness was about 0.5 $\mu$m. Onto the barrier layer, a 3000 Å thick CGL composed of the perylene CGM of structure X was deposited by vacuum evaporation:

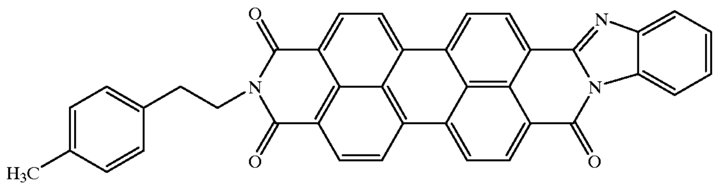

X

A CTL was prepared by mixing 40 weight percent TAND and 60 weight percent of the bisphenol-A polycarbonate Lexan™ 145 (General Electric Company) in dichloromethane to give a 10% solids solution. After the solids had dissolved, the solution was coated onto the CGL, and the solvent was allowed to evaporate to give a CTL with a dry thickness of 13 $\mu$m.

Testing was performed as described in Example 1. The results are shown in Table 1.

EXAMPLE 5

A bipolar photoconductive element was prepared as follows. A nickel-coated PET support was coated with a barrier layer solution made of Amilon™ CM8000 in an ethanol/1,1,2-trichloroethane 60:40 mixture. The solvent was removed, and the barrier layer dry thickness was about 0.5 $\mu$m. Onto the barrier layer, a 3000 Å thick CGL composed of the perylene CGM of structure XI was deposited by vacuum evaporation:

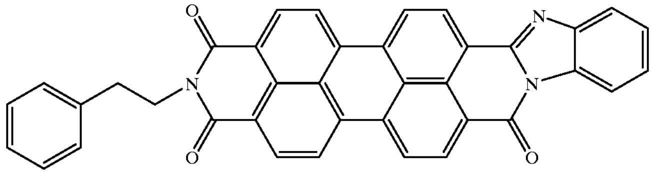

XI

A CTL was prepared by mixing 40 weight percent TAND and 60 weight percent of the bisphenol-A polycarbonate Lexan™ 145 (General Electric Company) in dichloromethane to give a 10% solids solution. After the solids had dissolved, the solution was coated onto the CGL, and the solvent was allowed to evaporate to give a CTL with a dry thickness of 13 $\mu$m.

Testing was performed as described in Example 1. The results are shown in Table 1.

EXAMPLE 6

A bipolar photoconductive element was prepared as follows. A nickel-coated PET support was coated with a barrier layer solution made of Amilon™ CM8000 in an ethanol/1,1,2-trichloroethane 60:40 mixture. The solvent was removed, and the barrier layer dry thickness was about 0.5 $\mu$M. Onto the barrier layer, a 3000 Å thick CGL composed of the perylene CGM of structure XII was deposited by vacuum evaporation:

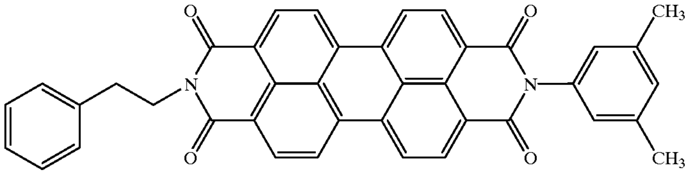

XII

A CTL was prepared by mixing 40 weight percent TAND and 60 weight percent of the polystyrene Dylene™ 8G in dichloromethane to give a 10% solids solution. After the solids had dissolved, the solution was coated onto the CGL, and the solvent was allowed to evaporate to give a CTL with a dry thickness of 13 $\mu$m.

Testing was performed as described in Example 1. Results are shown in Table 1.

EXAMPLE 7

A bipolar photoconductive element was prepared as follows. An aluminum-coated PET support was coated with a barrier layer solution made of Amilon™ CM8000 in an ethanol/1,1,2-trichloroethane 60:40 mixture. The solvent was removed, and the barrier layer dry thickness was about 0.5 $\mu$m.

A 75:25 cocrystalline mixture of unsubstituted titanyl phthalocyanine and titanyl tetrafluorophthalocyanine was used for the CGL. The mixture was prepared as follows.

A 2.5 gallon attritor (1S series), made by Union Process Company, was loaded at 53% with stainless steel 3 mm spheres media, 192 g of the cocrystal preparation 3, 48 g of poly[4,4-xylylene-co-2,2'-oxydiethylene) (46/54) isophthalate-co-5-sodiosulfoisophthalate 95/5], 1800 g of dichloromethane, and 1200 g of 1,1,2-trichloroethane. The media height was leveled with the liquid. The mixture was milled at 125 rpm for 3 hours. Then the mil was lowered to 100 rpm. A premixed solution consisting of 144 g of poly[4,4-xylylene-co-2,2'-oxydiethylene) (46/54) isophthalate-co-5-sodiosulfoisophthalate 95/5], 11369 g of dichloromethane, and 3444 g of 1,1,2-trichloroethane was added to the attritor. The mixture was milled at 100 rpm for 15 minutes. Then a mixture of 259.28 g of dichloromethane and 111.12 g of 1,1,2-trichloroethane was added. Mixing was continued for another five minutes before the dispersion was discharged through a screen and diluted to 2% solids. The dispersion was coated onto the barrier layer and the solvents removed to give a CGL with a dry thickness of 0.625 μm.

A CTL was prepared by mixing 50 weight percent TAND and 50 weight percent of the bisphenol-A polycarbonate Makrolon™ 5705 (Mobay Chemical Company) in dichloromethane to give a 10% solids solution. After the solids had dissolved, the solution was coated onto the CGL, and the solvent was caused to evaporate to give a CTL with a dry thickness of 9 μm.

Testing was performed as described in Example 1. The results are shown in Table 1.

EXAMPLE 8

A bipolar photoconductive element was prepared as follows. First. the CGL was coated onto a nickel-coated PET support to give a dry thickness of 6 μm. The CGL coating mixture comprised 49.1 wt % bisphenol-A polycarbonate (Lexan™ 145 available from General Electric Company), 2.4 wt % polyester dimethyl terephthalate/ethylene glycol/neopentylglycol, 39.1 wt % 1,1-bis(di-4-tolylaminophenyl) cyclohexane, 0.75 wt % diphenylbis-(4-diethylaminophenyl)methane, 6.4 wt % 4-(4-dimethylaminophenyl)-2,6-diphenylthiapyrylium hexafluorophosphate, 1.6 wt % 4-(4-dimethylaminophenyl)-2-(4-ethoxyphenyl)-6-pheylthiapyrylium fluoroborate, and 0.6 wt % of the aggregate seed (a dried paste of the above CGL mixture which had been previously prepared). The CGL mixture was prepared at 9 wt % in an 80/20 (wt/wt) mixture of dichioromethane and 1,1,2-trichloroethane. A coating surfactant, DC510 (Dow Corning Corporation), was added at a concentration of 0.05 wt % of the total CGL mixture.

A CTL was prepared by mixing 40 weight percent TAND and 60 weight percent of the polystyrene Dylene™ 8G in a 70/30 wtlwt mixture of dichloromethane and methyl acetate to give a 10% solids solution. After the solids had dissolved, the solution was coated onto the dry CGL, and the solvent was caused to evaporate to give a CTL with a dry thickness of 13 μm.

Testing was performed as described in Example 1. The results are shown in Table 1.

EXAMPLE 9

A bipolar photoconductive element was prepared as follows. A nickel-coated PET support was coated with a barrier layer solution made of Amilon™ CM8000 in an ethanol/1,1,2-trichloroethane 60:40 mixture. The solvent was removed, and the barrier layer dry thickness was about 0.5 μm. Onto the barrier layer, a 3000 Å thick CGL composed of the perylene CGM of structure VII was deposited by vacuum evaporation.

A CTL was prepared by mixing 40 weight percent TAND and 60 weight percent of the bisphenol-A polycarbonate Makrolon™ 5705 (Mobay Chemical Company) in dichloromethane to give a 10% solids solution. After the solids had dissolved, the solution was coated onto the CGL, and the solvent was caused to evaporate to give a CTL with a dry thickness of 9 μm.

Testing was performed as described in Example 1. The results are shown in Table 1.

EXAMPLE 10

A bipolar photoconductive element was prepared as follows. A nickel-coated PET support was coated with a barrier layer solution made of Amilon™ CM8000 in an ethanol/1,1,2-trichloroethane 60:40 mixture. The solvent was removed, and the barrier layer dry thickness was about 0.5 μm. Onto the barrier layer, a 3000 Å thick CGL composed of the perylene CGM of structure VII was deposited by vacuum evaporation.

A CTL was prepared by mixing together 40 weight percent TAND and 60 weight percent of the polystyrene Dylene™ 8G in a 70/30 w/w mixture of dichloromethane and methyl acetate to give a 10% solids solution. After the solids had dissolved, the solution was coated onto the CGL, and the solvent was caused to evaporate to give a CTL with a dry thickness of 13 μm.

Testing was performed as described in Example 1. The results are shown in Table 1.

EXAMPLE 11

A bipolar photoconductive element was prepared as follows. A nickel-coated PET support was coated with a barrier layer solution made of Amilon™ CM8000 in an ethanol/1,1,2-trichloroethane 60:40 mixture. The solvent was removed, and the barrier layer dry thickness was about 0.5 μm. Onto the barrier layer, a 3000 Å thick CGL composed of the perylene CGM of structure VII was deposited by vacuum evaporation.

A CTL was prepared by mixing together 30 weight percent TAND and 70 weight percent of the bisphenol-A polycarbonate Lexan™ 145 (General Electric Company) in dichloromethane to give a 10% solids solution. After the solids had dissolved, the solution was coated onto the CGL, and the solvent was caused to evaporate to give a CTL with a dry thickness of 13 μm.

Testing was performed as described in Example 1. The results are shown in Table 1.

COMPARATIVE EXAMPLE 1

A bipolar photoconductive element was prepared as follows. A nickel-coated PET support was coated with a barrier layer solution made of Amilon™ CM8000 in an ethanol/1,1,2-trichloroethane 60:40 mixture. The solvent was removed, and the barrier layer dry thickness was about 0.5 μm. Onto the barrier layer, a 3000 Å thick CGL composed of the perylene CGM of structure XIII was deposited by vacuum evaporation:

XIII

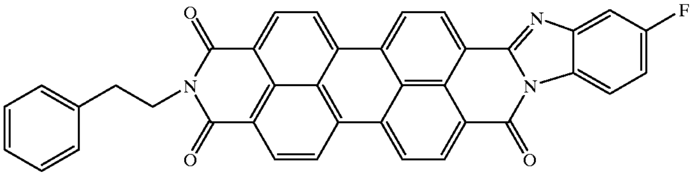

A CTL was prepared by mixing together 40 weight percent TAND and 60 weight percent of the bisphenol-A polycarbonate Lexan™ 145 (General Electric Company) in dichloromethane to give a 10% solids solution. After the solids had dissolved, the solution was coated onto the CGL, and the solvent was caused to evaporate to give a CTL with a dry thickness of 13 μm.

Testing was performed as described in Example 1. The results are shown in Table 1.

COMPARATIVE EXAMPLE 2

A bipolar photoconductive element was prepared as follows. A nickel-coated PET support was coated with a barrier layer solution made of Amilon™ CM8000 in an ethanol/1, 1,2-trichloroethane 60:40 mixture. The solvent was removed, and the barrier layer dry thickness was about 0.5 μm. Onto the barrier layer, a 3000 μ thick CGL composed of the perylene CGM of structure XIV was deposited by vacuum evaporation:

XIV

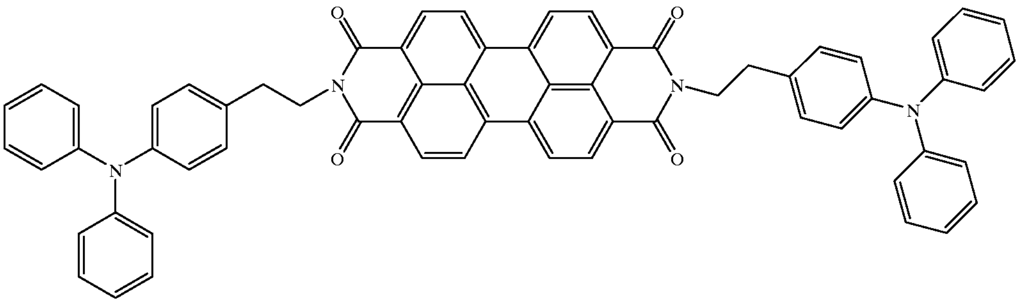

A CTL was prepared by mixing together 40 weight percent TAND and 60 weight percent of the bisphenol-A polycarbonate Lexan™ 145 (General Electric Company) in dichloromethane to give a 10% solids solution. After the solids had dissolved, the solution was coated onto the CGL, and the solvent was allowed to evaporate to give a CTL with a dry thickness of 13 μm.

Testing was performed as described in Example 1. The results are shown in Table 1.

COMPARATIVE EXAMPLE 3

A bipolar photoconductive element was prepared as follows. A nickel-coated PET support was coated with a barrier layer solution made of Amilon™ CM8000 in an ethanol/1, 1,2-trichloroethane 60:40 mixture. The solvent was removed, and the barrier layer dry thickness was about 0.5 μm. Onto the barrier layer, a 3000 Å thick CGL composed of the perylene CGM of structure XV was deposited by vacuum evaporation:

XV

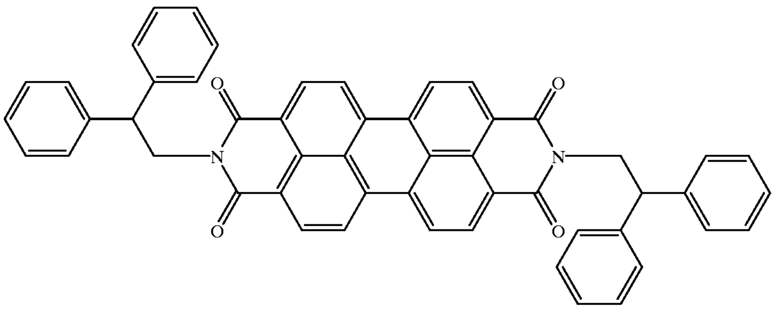

A CTL was prepared by mixing together 40 weight percent TAND and 60 weight percent of the bisphenol-A polycarbonate Lexan™ 145 (General Electric Company) in dichloromethane to give a 10% solids solution. After the solids had dissolved, the solution was coated onto the CGL, and the solvent was caused to evaporate to give a CTL with a dry thickness of 13 μm.

Testing was performed as described in Example 1. The results are shown in Table 1.

COMPARATIVE EXAMPLE 4

A bipolar photoconductive element was prepared as follows. A nickel-coated PET support was coated with a barrier layer solution made of Amilon™ CM8000 in an ethanol/1, 1,2-trichloroethane 60:40 mixture. The solvent was removed, and the barrier layer dry thickness was about 0.5 μm. Onto the barrier layer, a 3000 Å thick CGL composed of the perylene CGM of structure XVI was deposited by vacuum evaporation:

XVI

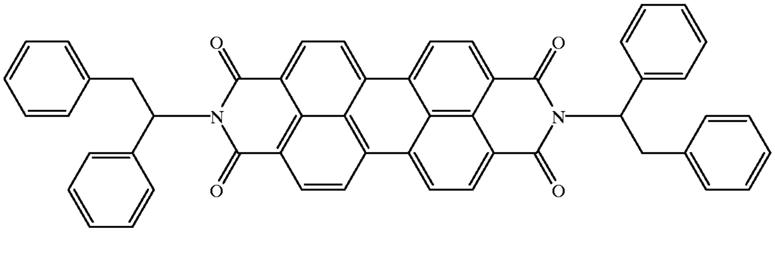

A CTL was prepared by mixing together 40 weight percent TAND and 60 weight percent of the bisphenol-A polycarbonate Lexan™ 145 (General Electric Company) in dichloromethane to give a 10% solids solution. After the solids had dissolved, the solution was coated onto the CGL, and the solvent was caused to evaporate to give a CTL with a dry thickness of 13 μm.

Testing was performed as described in Example 1. The results are shown in Table 1.

COMPARATIVE EXAMPLE 5

A bipolar photoconductive element was prepared as follows. A nickel-coated PET support was coated with a barrier layer solution made of Amilon™ CM8000 in an ethanol/1, 1,2-trichloroethane 60:40 mixture. The solvent was removed, and the barrier layer dry thickness was about 0.5 μm. Onto the barrier layer, a 3000 Å thick CGL composed of the perylene CGM of structure XVII was deposited by vacuum evaporation:

XVII

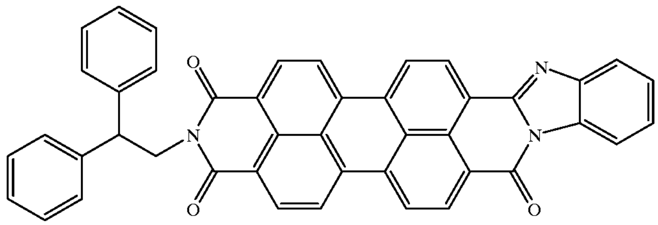

A CTL was prepared by mixing together 40 weight percent TAND and 60 weight percent of the bisphenol-A polycarbonate Lexan™ 145 (General Electric Company) in dichloromethane to give a 10% solids solution. After the solids had dissolved, the solution was coated onto the CGL, and the solvent was allowed to evaporate to give a CTL with a dry thickness of 13 μm.

Testing was performed as described in Example 1. The results are shown in Table 1.

COMPARATIVE EXAMPLE 6

A bipolar photoconductive element was prepared as follows. A nickel-coated PET support was coated with a barrier layer solution made of Amilon™ CM8000 in an ethanol/1, 1,2-trichloroethane 60:40 mixture. The solvent was removed, and the barrier layer dry thickness was about 0.5 μm. Onto the barrier layer, a 3000 Å thick CGL composed of the perylene CGM of structure XVIII was deposited by vacuum evaporation:

XVIII

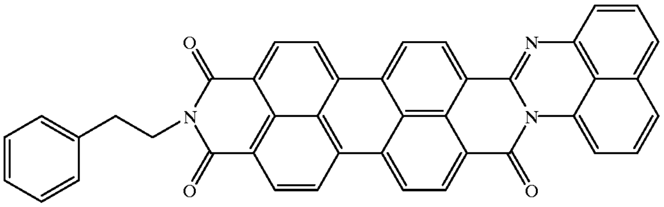

A charge transport layer was prepared by mixing together 40 weight percent TAND and 60 weight percent of the bisphenol-A polycarbonate Lexan™ 145 (General Electric Company) in dichloromethane to give a 10% solids solution. After the solids had dissolved, the solution was coated onto the CGL, and the solvent was caused to evaporate to give a CTL with a dry thickness of 13 $\mu$m.

Testing was performed as described in Example 1. The results are shown in Table 1.

The elements of this invention are the first examples of useful photoconductive elements which contain a single charge transport material capable of transporting both electrons and holes.

The invention has been described in detail with particular reference to certain preferred embodiments thereof, but it will be understood that variations and modifications can be effected within the spirit and scope of the invention.

TABLE 1

| | $E_{50\%}$ (erg/cm$^2$) | | | Residual voltage (V) | | Dark decay (V) | |
|---|---|---|---|---|---|---|---|
| | Under | Under | | | | | |
| Example or Comparative Example | positive polarity initial surface charge + ($E_{50\%}$) | negative polarity initial surface charge − ($E_{50\%}$) | α | Under positive polarity initial surface charge | Under nagative polarity initial surface charge | Under positive polarity initial surface charge | Under negative polarity initial surface charge |
| Ex. 1 | 6.0 | 6.3 | 0.95 | 22 | 10 | 10 | 7 |
| Ex. 2 | 6.9 | 6.0 | 1.15 | 35 | 25 | 3 | 2 |
| Ex. 3 | 10.5 | 10.2 | 1.03 | 90 | 22 | 23 | 10 |
| Ex. 4 | 4.8 | 15.9 | 0.30 | 28 | 113 | 45 | 2 |
| Ex. 5 | 6.3 | 21.0 | 0.30 | 30 | 110 | 18 | 2 |
| Ex. 6 | 11.4 | 51.6 | 0.22 | 75 | 130 | 45 | 2 |
| Ex. 7 | 3.0 | 2.0 | 1.50 | 85 | 15 | 10 | 28 |
| Ex. 8 | 16.8 | 4.5 | 3.73 | 135 | 10 | 22 | 5 |
| Ex. 9 | 7.2 | 7.2 | 1.00 | 55 | 15 | 7 | 3 |
| Ex. 10 | 7.8 | 6.2 | 1.26 | 40 | 10 | 2 | 3 |
| Ex. 11 | 15.3 | 6.9 | 2.22 | 80 | 30 | 3 | 0 |
| Comp. Ex. 1 | —[1] | —[2] | — | —[1] | 345 | —[1] | 3 |
| Comp. Ex. 2 | —[3] | —[3] | — | —[3] | —[3] | —[3] | —[3] |
| Comp. Ex. 3 | —[3] | —[3] | — | —[3] | —[3] | —[3] | —[3] |
| Comp. Ex. 4 | —[2] | —[2] | — | 275 | 345 | 3 | 2 |
| Comp. Ex. 5 | —[1] | —[2] | — | —[1] | 300 | —[1] | 2 |
| Comp. Ex. 6 | —[1] | —[2] | — | —[1] | 415[4] | —[1] | 5 |

[1]Poor charge acceptance and dark decay properties of the element made it incapable of being charged to +400 V, indicating unsuitability for use in an electrophotographic process.
[2]Residual voltage was too high to permit measurement.
[3]No photo-induced discharge observed.
[4]Initial surface potential was −465 V.

The photoconductive elements of the Examples demonstrate that the elements of this invention have useful electrophotographic properties and are bipolar photoconductive elements useful in an electrophotographic process or apparatus. The photoconductive elements of the Comparative Examples demonstrate three points. First, use of a bipolar CTM does not, by itself, guarantee the production of a useful photoconductive element. Second, not all perylene CGMs are useful in combination with TAND. Finally, charge acceptance, dark decay, residual voltage, and sensitivity of a photoconductive element are strongly determined by the combination of CGM and CTM used.

Thus, it is demonstrated that the photoconductive elements of this invention exhibit useful properties for an electrophotographic process while offering the substantial advantage of being useful under both polarities of charging.

What is claimed is:

1. A bipolar photoconductive element comprising an electrically conductive support and at least one active layer, said active layer comprising N-(p-(di-p-tolylamino)phenyl)-N'-(1,2-dimethylpropyl)-1,4,5,8-naphthalenetetracarboxylic diimide and one or more perylene dyes of structure I:

I

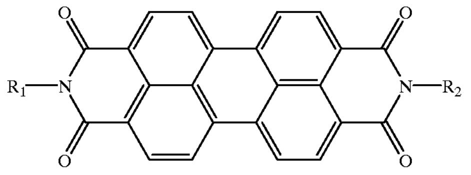

wherein $R_1$ and $R_2$ are, each independently,

II

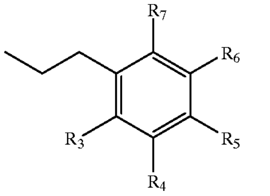

or

III

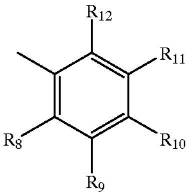

and $R_3$, $R_4$, $R_5$, $R_6$, $R_7$, $R_8$, $R_9$, $R_{10}$, $R_{11}$ and $R_{12}$ are, each independently, H, $CH_3$, or $C_2$–$C_4$ alkyl, linear or branched.

2. The photoconductive element of claim 1 wherein at least two of $R_3$, $R_4$, $R_5$, $R_6$ and $R_7$ are H and at least two of $R_8$, $R_9$, $R_{10}$, $R_{11}$ and $R_{12}$ are H.

3. The photoconductive element of claim 1 wherein which at least three of $R_3$, $R_4$, $R_5$, $R_6$ and $R_7$ are H and at least three of $R_8$, $R_9$, $R_{10}$, $R_{11}$ and $R_{12}$ are H.

4. The photoconductive element of claim 1 wherein $R_1$ is structure <u>II</u>, wherein all of $R_3$, $R_4$, $R_5$, $R_6$, and $R_7$ are H, and $R_2$ is structure <u>III</u>, wherein $R_9$ and $R_{11}$ are $CH_3$ and $R_8$, $R_{10}$, and $R_{12}$ are H.

5. The photoconductive element of claim 1 wherein $R_1$ is structure <u>II</u>, wherein all of $R_3$, $R_4$, $R_5$, $R_6$, and $R_7$ are H, and $R_2$ is structure <u>II</u>, wherein $R_4$is $CH_3$ and $R_3$, $R_5$, $R_6$, $R_7$ are H.

6. The photoconductive element of claim 1 wherein both $R_1$ and $R_2$ are structure <u>II</u>, with $R_4$ being $CH_3$ and $R_3$, $R_5$, $R_6$, $R_7$ being H.

7. The photoconductive element of claim 1 wherein both $R_1$ and $R_2$ are structure <u>II</u> with all of $R_3$, $R_4$, $R_5$, $R_6$, and $R_7$ are H.

8. A bipolar photoconductive element comprising an electrically conductive support and at least one active layer, said active layer comprising N-(p-(di-p-tolylamino)phenyl)-N'-(1,2-dimethylpropyl)-1,4,5,8-naphthalenetetracarboxylic diimide and one or more perylene dye of structure IV:

IV

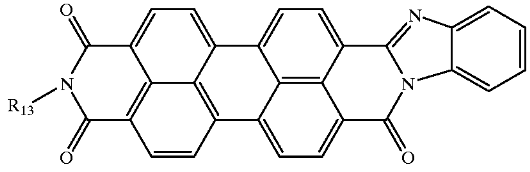

wherein $R_{13}$ is structure <u>II</u>:

II

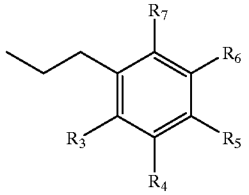

with $R_3$, $R_4$, $R_5$, $R_6$, and $R_7$ being, each independently, H, $CH_3$, or $C_2$–$C_4$ alkyl, linear or branched.

9. A photoconductive element according to claim 8 wherein $R_3$, $R_4$, $R_6$, and $R_7$ are H and $R_5$ is H.

10. A photoconductive element according to claim 8 wherein $R_3$, $R_4$, $R_6$, and $R_7$ are H and $R_5$ is $CH_3$.

11. A bipolar photoconductive element comprising an electrically conductive support and at least one active layer, said active layer comprising N-(p-(di-p-tolylamino)phenyl)-N'-(1,2-dimethylpropyl)-1,4,5,8-naphthalenetetracarboxylic diimide and at least one charge generating pigment selected from the group consisting of titanyl fluorophthalocyanines and cocrystailine mixtures of unsubstituted titanyl phthalocyanine and titanyl fluorophthalocyanine, said titanyl fluorophthalocyanines having the structure:

V

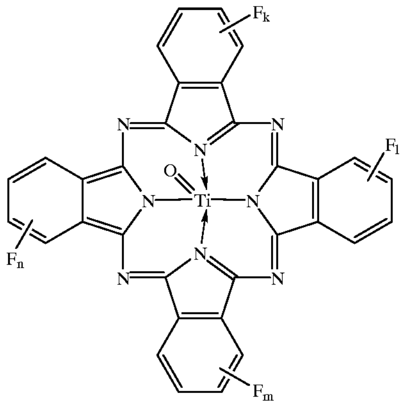

where each of k, l, m, and n is independently an integer from 1 to 4.

12. The photoconductive element of claim 11 wherein said charge generating pigment is a cocrystalline mixture of unsubstituted titanyl phthalocyanine and titanyl tetrafluorophthalocyanine of structure V.

13. A bipolar photoconductive element comprising an electrically conductive support and at least one active layer, said active layer comprising N-(p-(di-p-tolylamino)phenyl)-N'-(1,2-dimethylpropyl)-1,4,5,8-naphthalenetetracarboxylic diimide and a dye-polymer aggregate charge generation material.

14. The photoconductive element of claim 1, 8, 11, or 13 wherein said active layer is a single layer.

15. The photoconductive element of claim 1, 8, 11, or 13 wherein said active layer is function separated and comprises at least one charge generation layer and at least one charge transport layer, at least one of said charge generation layers comprising one or more charge generation materials selected from the group consisting of one or more perylene dyes of structure I, one or more perylene dyes of structure IV, titanyl fluorophthalocyanines, cocrystalline mixtures of unsubstituted titanyl phthalocyanine and titanyl fluorophthalocyanine, and dye-polymer aggregate charge generation materials and at least one of said charge transport layers comprising N-(p-(di-p-tolylamino)phenyl)-N'-(1,2-dimethylpropyl)-1,4,5,8-naphthalenetetracarboxylic diimide.

16. The photoconductive element of claim 1, 8, 11, or 13, wherein a barrier layer is present between the electrically conductive support and the active layer.

17. The photoconductive element of claim 1, 8, 11, or 13, wherein a protective layer is present as the outermost layer on the element.

18. The element according to claim 17, wherein said protective layer comprises diamond-like carbon.

19. The photoconductive element of claim 1 wherein the charge transport material is N-(p-(di-p-tolylamino)phenyl)-N'-(1,2-dimethylpropyl)-1,4,5,8-naphthalenetetracarboxylic diimide and is present in a concentration ranging from 30–100 weight percent based on the composition of the layer in which it resides.

20. The photoconductive element of claim 1 wherein said active layer consists of one charge generation layer and one charge transport layer, said charge generation layer comprising a perylene dye of structure I in which both $R_1$ and $R_2$ are structure II with all of $R_3$, $R_4$, $R_5$, $R_6$, and $R_7$ being H, and said charge transport layer comprising N-(p-(di-p-tolylamino)phenyl)-N'-(1,2-dimethylpropyl)-1,4,5,8-naphthalenetetracarboxylic diimide present in a concentration of between about 30 and 100 weight percent based on the composition of the charge transport layer.

21. The photoconductive element of claim 1 wherein said active layer consists of one charge generation layer and one charge transport layer, said charge generation layer comprising a perylene dye of structure I in which both $R_1$ and $R_2$ are structure II with all of $R_3$, $R_4$, $R_5$, $R_6$, and $R_7$ being H, and said charge transport layer comprising N-(p-(di-p-tolylamino)phenyl)-N'-(1,2-dimethylpropyl)-1,4,5,8-naphthalenetetracarboxylic diimide present in a concentration of between about 30 and about 60 weight percent based on the composition of the charge transport layer.

* * * * *